United States Patent
Jansson et al.

(10) Patent No.: US 9,424,023 B2
(45) Date of Patent: Aug. 23, 2016

(54) UNIFIED SYSTEM LIFECYCLE FOR COMPONENTS IN AN INTEGRATED SOFTWARE AND HARDWARE SYSTEM

(75) Inventors: Daniel Jansson, San Francisco, CA (US); Terje Strand, San Francisco, CA (US); Boris Selitser, Castro Valley, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 693 days.

(21) Appl. No.: 13/339,098

(22) Filed: Dec. 28, 2011

(65) Prior Publication Data
US 2012/0166632 A1  Jun. 28, 2012

Related U.S. Application Data (60) Provisional application No. 61/427,754, filed on Dec. 28, 2010.

(51) Int. Cl.
*G06F 15/173* (2006.01)
*G06F 9/44* (2006.01)
(Continued)

(52) U.S. Cl.
CPC ............. *G06F 8/70* (2013.01); *G06F 13/4081* (2013.01); *H04L 67/34* (2013.01)

(58) Field of Classification Search
CPC ....... G06F 8/70; G06F 13/4081; H04L 67/34
USPC ......................................... 709/224
See application file for complete search history.

(56) References Cited

U.S. PATENT DOCUMENTS 6,895,007 B1  5/2005  Teraoka
7,114,065 B2  9/2006  Chu et al.
(Continued)

FOREIGN PATENT DOCUMENTS

GB    2469690       10/2010
JP    2004334679    11/2004
(Continued)

OTHER PUBLICATIONS

Oracle International Corporation, Oracle Communications Service Broker Netra 6000 High Availability Manager Administrators Guide, Mar. 2012, 168 pages.
(Continued)

*Primary Examiner* — David Lazaro
*Assistant Examiner* — Xiang Yu
(74) *Attorney, Agent, or Firm* — Tucker Ellis LLP (57) ABSTRACT

An integrated software and hardware system is described that implements a unified lifecycle for the hardware and the software components therein. In the context of adding, removing or moving a hardware appliance, this allows the system to create, coordinate and manage a single lifecycle for each appliance together with its software processes, that is being moved or changed. The system includes a chassis with multiple enclosures for computing blades. Each blade in the chassis is assigned either a worker or bootstrap role. The worker blades perform the core processing of the service broker functionality and the bootstrap blades are used to provide the bootstrapping and administration of the worker blades. In particular, the administration features include an administration console that is provided by the bootstrap blade, which provides hardware management and process management.

20 Claims, 4 Drawing Sheets

(51) Int. Cl.
*H04L 29/08* (2006.01)
*G06F 13/40* (2006.01)

(56) References Cited

U.S. PATENT DOCUMENTS

| | | | |
|---|---|---|---|
| 7,114,068 B2 | 9/2006 | Chu et al. | |
| 7,130,995 B2 | 10/2006 | Chu et al. | |
| 7,415,535 B1 | 8/2008 | Kuik et al. | |
| 8,032,776 B2 | 10/2011 | Merkin | |
| 8,402,003 B2 | 3/2013 | Biran et al. | |
| 2003/0105904 A1 | 6/2003 | Abbondanzio | |
| 2003/0226004 A1 | 12/2003 | Abbondanzio | |
| 2005/0010715 A1 | 1/2005 | Davies et al. | |
| 2006/0026235 A1 | 2/2006 | Schwarz et al. | |
| 2006/0026325 A1 | 2/2006 | Huang et al. | |
| 2006/0143255 A1 | 6/2006 | Shinohe | |
| 2006/0155837 A1 | 7/2006 | Kobayashi et al. | |
| 2006/0167886 A1 | 7/2006 | Kantesaria | |
| 2007/0100933 A1 | 5/2007 | Davies et al. | |
| 2007/0130305 A1 | 6/2007 | Piper et al. | |
| 2007/0168476 A1 | 7/2007 | Davies et al. | |
| 2007/0276997 A1 | 11/2007 | Luning et al. | |
| 2008/0022148 A1* | 1/2008 | Barnea et al. | 714/5 |
| 2008/0028107 A1 | 1/2008 | Cherian et al. | |
| 2008/0104217 A1 | 5/2008 | Srinivasa et al. | |
| 2008/0271039 A1* | 10/2008 | Rolia et al. | 718/105 |
| 2009/0044036 A1 | 2/2009 | Merkin | |
| 2009/0222836 A1* | 9/2009 | Paval | 718/104 |
| 2009/0240907 A1 | 9/2009 | Crandell | |
| 2009/0276513 A1 | 11/2009 | Holdaway et al. | |
| 2010/0049822 A1 | 2/2010 | Davies et al. | |
| 2010/0057905 A1 | 3/2010 | Enscoe | |
| 2010/0064169 A1 | 3/2010 | Davies et al. | |
| 2010/0125477 A1 | 5/2010 | Mousseau et al. | |
| 2010/0205421 A1* | 8/2010 | Campbell et al. | 713/2 |
| 2011/0010702 A1 | 1/2011 | Vrushabendrappa et al. | |
| 2011/0119756 A1 | 5/2011 | McClusky | |
| 2012/0151585 A1 | 6/2012 | Lamastra et al. | |
| 2012/0166786 A1 | 6/2012 | Selitser | |
| 2012/0167073 A1 | 6/2012 | Stevens | |
| 2013/0117359 A1* | 5/2013 | Husain et al. | 709/203 |
| 2013/0263206 A1 | 10/2013 | Nefedov et al. | |

FOREIGN PATENT DOCUMENTS

| | | |
|---|---|---|
| JP | 2006164095 | 6/2006 |
| JP | 2007183837 | 7/2007 |
| JP | 2008140280 | 6/2008 |
| JP | 2009129204 | 6/2009 |
| WO | WO 2009007619 | 1/2009 |

OTHER PUBLICATIONS

International Search Report dated May 30, 2012 for Application No. PCT/US2011/067389, 10 pages.
State Intellectual Property Office of the People'S Republic of China Search Report dated Apr. 24, 2015 for Application No. 201180044932.0, 2 pages.
United States Patent and Trademark Office, Office Action Dated Jul. 6, 2016 for U.S. Appl. No. 13/339,074, 12 pages.

\* cited by examiner

FIGURE 4

UNIFIED SYSTEM LIFECYCLE FOR COMPONENTS IN AN INTEGRATED SOFTWARE AND HARDWARE SYSTEM

CLAIM OF PRIORITY

The present application claims the benefit of the following U.S. Provisional Patent Application, which is incorporated by reference herein in its entirety:

U.S. Provisional Patent Application No. 61/427,754, entitled "INTEGRATED SOFTWARE AND HARDWARE SYSTEM THAT SERVES AS A COMMUNICATIONS SERVICE BROKER," by Boris Selitser et al., filed on Dec. 28, 2010.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to mobile communications and in particular to providing an integrated software/hardware service broker in the telecom network.

BACKGROUND

In the context of telecommunications (telecom), a mobile network operator or wireless service provider provides telephone and other services to its mobile phone subscribers. These operators typically deploy the equipment to offer these services, such as the radio transmitter network and the core network. Additionally, operators often deploy other service platforms such as voicemail, short message service (SMS) centers and many others.

As operators evolve current network infrastructure from legacy Signaling System Number 7 (SS7) to IP-based networks, they must continue to deliver and leverage legacy services to protect key revenue streams. Service providers must also continue to innovate while maintaining support for legacy Intelligent Network (IN) functionality and changing network infrastructure, developing new and compelling offerings that create strategic competitive advantage. In this context, it has become desirable to provide operators with a system that enables service interaction across diverse network types, orchestrates multiple services in real-time and enables the creation of innovative blended services. It is also desirable that the system be fully integrated and provide unified management of all software and hardware components thereon.

BRIEF SUMMARY

In accordance with various embodiments, an integrated software and hardware system is described that implements a unified lifecycle for the hardware and the software components therein. In the context of adding, removing or moving a hardware appliance, this allows the system to create, coordinate and manage a single unified lifecycle for each appliance together with its software processes, that is being moved or changed on the system. In accordance with an embodiment, the system includes a chassis with multiple enclosures for computing blades. Each blade inserted in the chassis is assigned either a worker or bootstrap role. The worker blades perform the core processing of the service broker functionality and the bootstrap blades are used to provide the bootstrapping and administration of the worker blades. In particular, the administration features include an administration console that is provided by the bootstrap blade, which provides hardware management and process management to enable the unified lifecycles.

DETAILED DESCRIPTION

In accordance with various embodiments, an integrated software and hardware system is described that implements a unified lifecycle for the hardware and the software components thereon. In the context of adding, removing or moving a hardware appliance, this enables the system to coordinate and create and manage a single lifecycle for each appliance together with its software processes that is being moved or changed.

In accordance with an embodiment, the integrated system functions as a communications service broker in a telecommunications (telecom) network environment. The system can be used to perform mediation and orchestration of services in the telecom network. The service broker is engineered as an integrated system that is comprised of service broker software, a selection of hardware, operating system level software and the management software to integrate all of these together. In accordance with one particular embodiment, the materials of the targeted Hardware platform can include Netra N6000 chassis, a number of Netra X6270 M2 LP blades, and OPUS NEM switches. However, many other types of hardware materials are possible within the scope of the present invention.

In accordance with various embodiments, the integrated system can provide a coordinated lifecycle of the distributed hardware and software system components. These system components can include compute modules, chassis enclosure, individual blades, connectivity module and others. In accordance with an embodiment, this allows the system to fully automate the lifecycle coordination of the various components in the system. As used herein, a blade denotes a computing device including a one or more central processing units (CPU's) and a physical memory. The physical memory of the blade can include a set of software programs (service broker processes) that perform a wide variety of functions. In accordance with an embodiment, each blade in the chassis is assigned either a worker or bootstrap role depending on the software running on it. The worker blades perform the core processing of the service broker functionality and the bootstrap blades are used to provide the bootstrapping and administration of the worker blades. In accordance with an embodiment, the worker role implies no disk storage or persistent state. Workers inherit identity and instance-specific configuration from the chassis slot that they are running in. These properties of the system allow the worker blades to be easily swapped and new worker blades to be added with little overhead management. The bootstrap blades provide the system with an administration console that can render the state and lifecycle information about each individual blade as a combination of hardware and the software running on that particular blade.

In accordance with various embodiments, the unified system lifecycle management includes both the hardware management and the process management of the integrated system.

In accordance with an embodiment, the hardware management has two main purposes: (1) craft interface and (2) programmatic hardware control. The craft interface provides a hardware focused view of the chassis required by the hardware servicing personnel within a telecommunications company. This interface gives visibility into all the chassis hardware components, allows monitoring their state, operational parameters, keep track of faults and alarms. The programmatic hardware control exposes a set of interfaces for the service broker appliance management code to be able to control and monitor the hardware platform.

In accordance with an embodiment, the process management of the integrated system includes two parts (1) an external management controller; and (2) an external management agent. The external management agent is a separate process that monitors, and can stop, start and restart the managed server processes. The agent receives its instruction from the external management controller which is integrated with the administration console. The admin console will be able to display the health of the separate managed server processes as well as the state of the individual managed servers.

In accordance with an embodiment, all service broker processes have an inherent lifecycle model built into their operation. This model includes at least three states:
  (1) Safe mode—sanity state with minimal components loaded intended for low level diagnosis and recovery purposes. The intention is that a process should always be able to reach this mode and fall back to it in cases of critical failures.
  (2) Administration mode—a state when all the components have been loaded but are available for management purposes only. In this case, only management interfaces are exposed by the process for provisioning, diagnostic and configuration purposes.
  (3) Running mode—the process is fully online, has joined the relevant cluster services it participates, is ready to receive and process traffic.

The common case is for a service broker process to transition between these states in the listed order when starting and in reverse order when shutting down. Based on administrative intervention a process could be requested to start or transition to any of these three states. Due to specific categories of errors detected during startup or while processing traffic a process will automatically take an action to transition to a preceding state.

Figure 1:
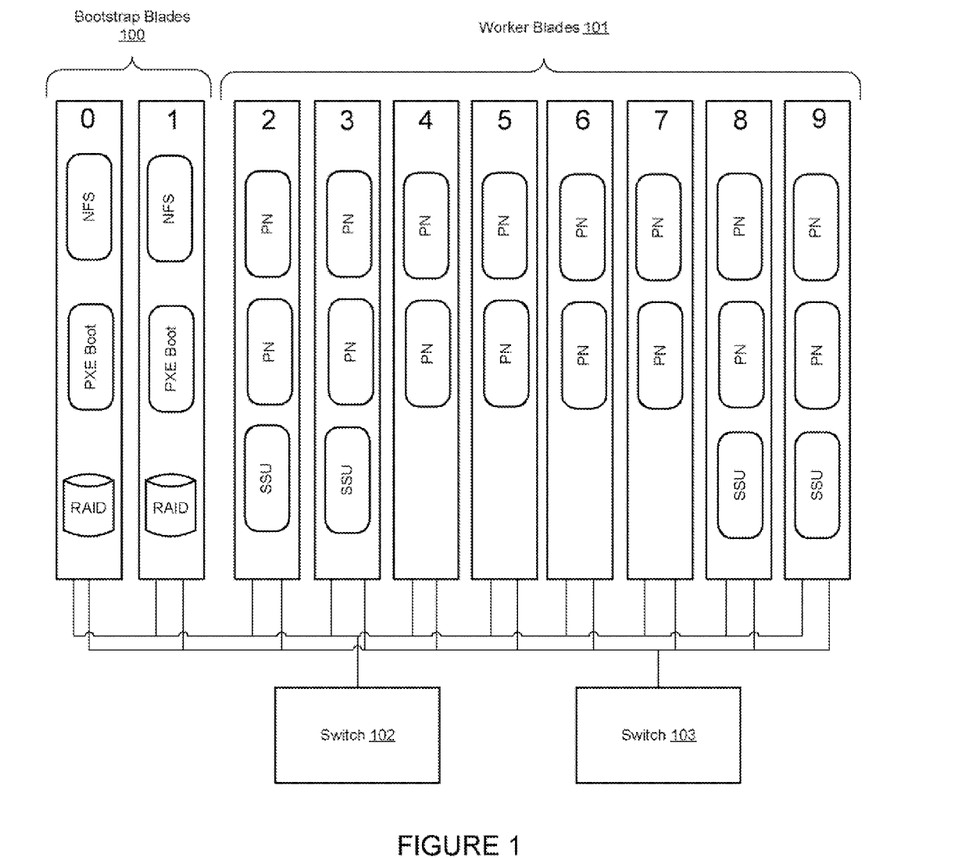
FIG. 1 is an illustration of the integrated system components as part of a single chassis, in accordance with various embodiments of the invention.

FIG. 1 is an illustration of the integrated system components as part of a single chassis, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

At the outermost layer the system is made up of one or more chassis running service broker (SB) software. The system supports scaling to multiple chassis connected by a TOR (Top of Rack) switch. In the illustrated embodiment, within each chassis there are up to 10 blades interconnected by dual redundant switches 102, 103. The switches are also used to provide redundant connections from the chassis to the TOR switches and through TOR switches to other networks on customer premises. FIG. 1 shows the key components of the system as part of a single chassis. Each blade is designated a worker or bootstrap role depending on the software that is running on it. Worker blades 101 run the SB application software and are utilized for performing the core SB function. Bootstrap blades 100 are used to provide a bootstrapping and administration function to the worker blades. Bootstrap blades run services that worker blades depend on. These services include network boot, redundant file system, and others. For high availability (HA) reasons bootstrap blades are provisioned in pairs and a single pair is sufficient to provide services to multiple SB chassis. As shown in FIG. 1, a single full chassis could have 2 bootstrap and 8 worker blades. In accordance with an embodiment, the worker role implies no disk storage or persistent state. Software running on workers relies on bootstrap blades to be available when it starts up after which point it could continue to run independently. Workers also inherit their identity and instance specific configuration from the chassis slot they are running in. These properties allow easily swapping and adding new workers with little management overhead. Bootstrap blades provide system-level functions only and do not process any SB application traffic. On average the load on the bootstrap blades should be relatively low. These characteristics should minimize chances of failure of the bootstrap blades. All the persistent state for the system is kept on the bootstrap blades where redundant access to that state is also provided. In accordance with an embodiment, bootstrap blades are not required to be online and functional for the workers to continue to operate as normal. Bootstraps should be present when a worker blade boots or worker processes restart.

In accordance with an embodiment, two types of SB processes run on the worker blades. Processing Node (PN) processes part of the Processing Tier and Signaling Server Unit (SSU) processes part of the Signaling Tier. SSU processes interface SB to external networks, don't use much memory, and are I/O intensive. The actual brokering logic and stateful protocol mediation occurs in the more memory-intensive PN processes. Also, SSU processes usually consume much less CPU than PN and fewer SSU than PN processes are required to support a given traffic volume. Roughly a ratio of 1-to-4 is used between SSU and PN processes.

Service Broker software and configuration can be bundled together into Domain Images (DI). Domain Images are groupings of .jar files containing the SB binaries and any associated configuration. PN and SSU processes are based on two separate DI's stored on the bootstrap blades. When a PN or SSU process starts up it pulls the binaries with related configuration from the corresponding DI. DI's are changed by a web-based administration console running on the bootstrap blades. These same DI's could also be updated by an external management console. External in this case refers to a console process running outside the chassis.

In accordance with one embodiment, a minimum high availability (HA) deployment consists of single chassis, 4 blades, and two switches. This configuration can provide at least dual redundant software components and redundancy for some of the hardware components. The 4 blades come out of 2 bootstrap and 2 worker instances. PN and SSU processes would be collocated on each of the worker blades and a single instance of such blade would be sufficient to maintains SB functional. A minimum of two chassis would be required to have dual redundancy of all hardware (HW) components. Multiple chassis would be connected through external switches.

In accordance with an embodiment, bootstrap blades provide a set of services towards the worker blades. These services include operating system (OS) booting, SB software deployment, software configuration, and SB logging. In accordance with an embodiment, the bootstrap blades are also where all the persistent state of the system is saved. This allows the worker blades to be easily replaced as whatever state needs to be preserved across reboots is going to be available via the bootstraps. It can be seen that the services bootstraps provide are critical for the normal operation of the system and for being able to recover from failures. For this reason the bootstrap blades should be highly available. Bootstrap blades run in primary-secondary configuration for services that should be provided in a singleton fashion across all the bootstrap instances. Services that should be run as singletons include pre-boot execution environment (PXE) server, dynamic host configuration protocol (DHCP) server, SB logging server, SB web console, and additional infrastructure for network file system (NFS) service.

Most worker blades have similar software running on them except for the SB level profile. As noted earlier there are two main SB software profiles that a blade could have. A PN-only profile or a PN-plus-SSU profile. In addition to that, each blade has a particular identity in terms of the internet protocol (IP) addresses it has assigned on various virtual local area networks (VLANs) and other unique identifiers. Each blade inherits it's identity from the chassis enclosure slot it happens to be running in. The identity is static and is therefore associated with the slot and not with the blade. This simplifies provisioning as blades are swapped or added to empty slots. At most, the PXE server configuration needs to be updated to reflect the media access control (MAC) address of the network interface card (NIC) for a blade being added. The differences in two SB software profiles are captured as PXE boot images. Each image consists of the OS, external Management Agent, and configuration scripts aware of blades identity. Two images exist to reflect PN-only and PN-plus-SSU profiles. The external Management Agent (eMA) implementation is the same on both images and it is set up to start after the OS boots. Process Instance Identity (PII)—logical identifier of a process within a blade; it is derived from the current Sys_Admin VLAN IP address and the process's fixed order relative to other processes on the blade; it is different from a PID as it remains constant between process restarts. PII exists for both PN and SSU processes. It serves as a predetermined way to refer to a SB process instance. Example use is to group process configuration specifics within a DI.

Figure 2:
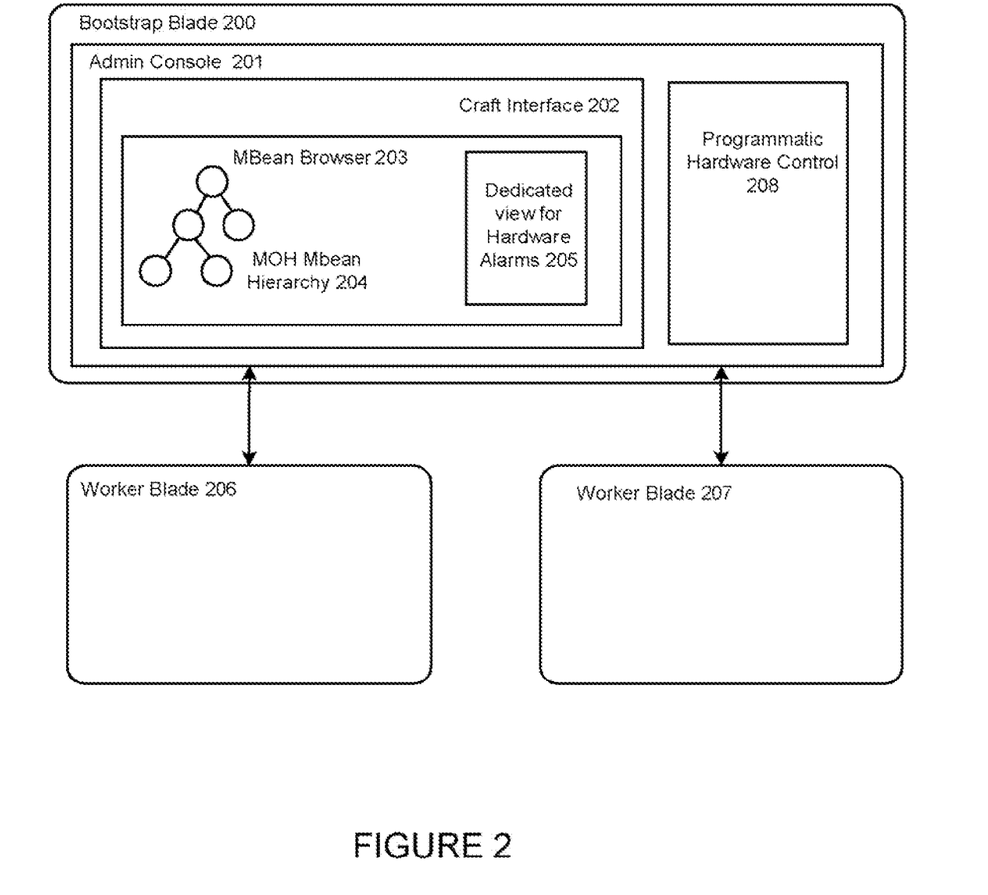
FIG. 2 is an illustration of the hardware management portion of the unified system lifecycle, in accordance with various embodiments of the invention.

FIG. 2 is an illustration of the hardware management portion of the unified system lifecycle, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, a bootstrap blade 200 can include an administration console which provides a craft interface 202 and programmatic hardware control 208. The craft interface is a hardware focused view of the chassis and all of its hardware components. It can allow monitoring the state of these components, operational parameters and faults and alarms. The craft interface is independent of any service broker processes. The programmatic hardware control 208, on the other hand, is a set of interfaces that enable the service broker appliance management code to control and monitor the hardware platform.

The craft interface 202 can be integrated and executed in-process with the administration console 201 on one of the bootstrap blades 200. Part of the craft interface can be a dedicated view in the administration console with a basic Managed Bean (MBean) browser 203. These can be Management Object Hierarchy (MOH) 204 MBeans that represent the hardware equipment being managed. Hardware diagnostics and statistics can be made accessible through the same MOH beans.

In accordance with an embodiment, part of the craft interface can be a single dedicated view for hardware alarms 205. These alarms can be modeled as MBeans in the MOH 204 and can be presented as log entries for alarms that occurred while the admin console 201 was running.

In accordance with an embodiment, the bootstrap blade(s) 200 has access to a global, multi-chassis-wide view of the equipment. Each individual external management agent process running on the worker blades 206, 207 can have a local MOH view restricted to the equipment of the specific host blade.

Figure 3:
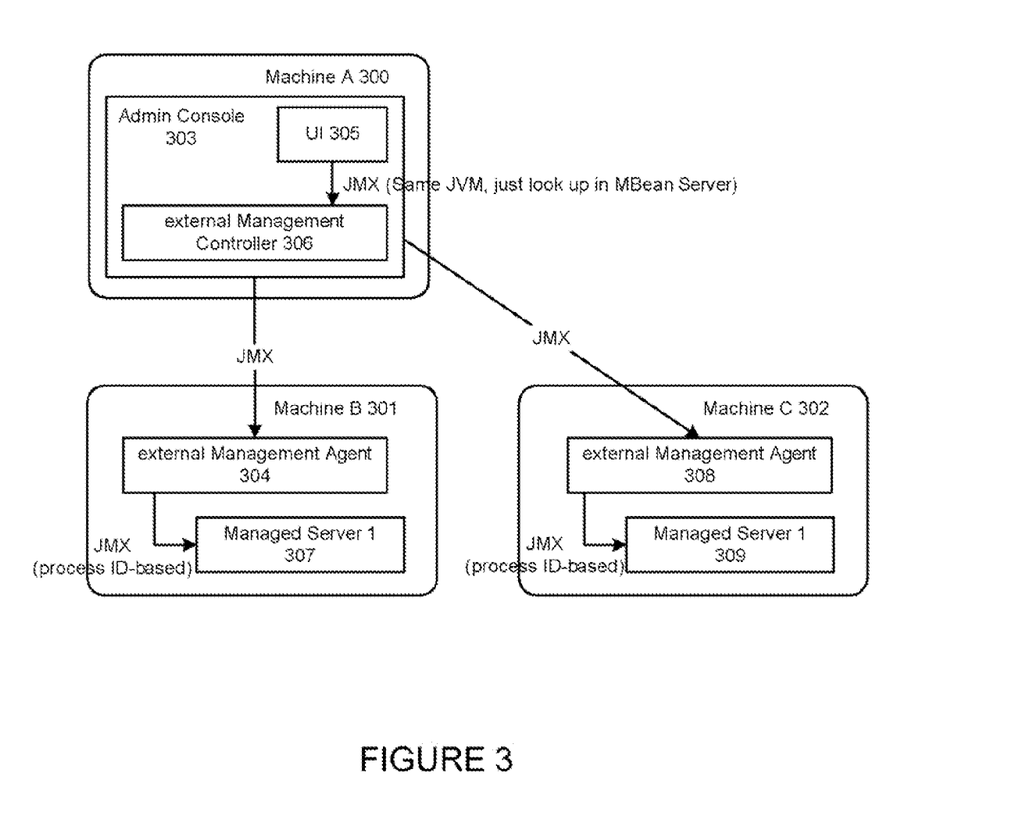
FIG. 3 is an illustration of the process management of the unified system lifecycle, in accordance with various embodiments of the invention.

FIG. 3 is an illustration of the process management of the unified system lifecycle, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, machine A 300 includes an admin console 303 which hosts the external management controller 306. Machine B 301 and machine C 302 contain external management agent processes (304, 308) that receive instructions from the controller 306.

In accordance with an embodiment, the different modules use mainly management beans to communicate between each other. The admin console 303 can include a user interface (UI) 305 will talk internally to the external management controller which has an MBean interface to reflect the health and state of the servers. The external management controller thus registers itself into the MBean server on the admin console. The external management also uses JMX to talk to the different server's external management agents. The external management agents have MBean interfaces identical to what the external management controller has, but these interfaces are all reflecting the health and state of processes that are on that node/machine. The external Management Agent communicates with the Java process through PID-based JMX. If a managed server (307, 309) process is not available, it will be reported as shut down.

Figure 4:
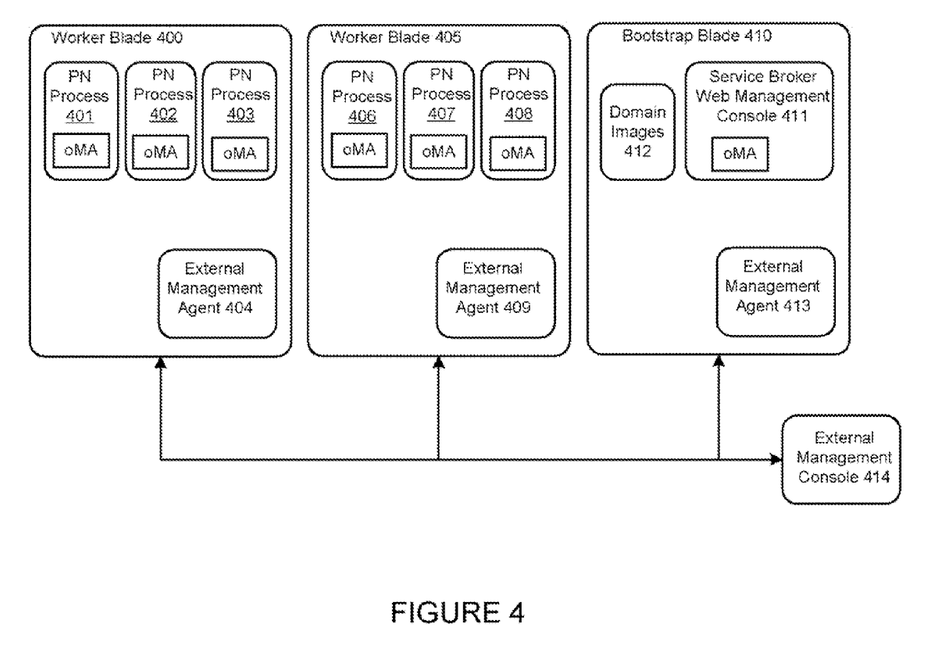
FIG. 4 is an illustration of some management capabilities of the service broker, in accordance with various embodiments of the invention.

FIG. 4 is an illustration of some management capabilities of the service broker, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In accordance with various embodiments, a set of additional management capabilities can be productized with the service broker software. These capabilities involve external coordination of SB processes together with integration of SB management with host OS and hardware. An external Management Agent (eMA) 404, 409, 413 is a software component that is responsible for implementing these management capabilities. A single instance of eMA runs in it's own process on each blade (worker 400, 405 and bootstrap 410). eMA is responsible for the managed SB processes on the same blade.

In complement to external management done by eMA there is an internal management capability that is exposed by every managed SB process. SB broker software runs on Open Services Gateway initiative (OSGi) Service Platform, which defines a Management Agent entity responsible for all aspects of administering the Service Platform instance that it is part of. This entity is referred to as the OSGi Management Agent (oMA). oMA runs in-process with the Service Platform for which it exposes control and metrics over a management protocol. The management protocol is left up to a particular implementation. oMA runs in all SB processes (401, 402, 403, 406, 407, 408, 411) including web-based or standalone consoles. One implementation of oMA can be based on JMX running over remote method invocation (RMI). eMA interacts with management operations exposed by oMA for a particular process. eMA's responsibility is to coordinate between multiple oMA's and to monitor the SB processes health. eMA directs the overall lifecycle of the SB processes on a given blade. This lifecycle includes starting a process, stopping a process, and transitioning it through various states.

In accordance with an embodiment, wherever service broker lifecycle intersects with that of OS or hardware, eMA serves as the integration point. One example is graceful shutdown of a worker blade for upgrade or replacement purposes. eMA serves as the single point of control for monitoring SB process shutdown progress and handing over to lower layers in the stack for their respective shutdown. Beyond pure SB process management, eMA can also be responsible for the automated administration of the host OS runtime environment. In accordance with an embodiment, only runtime changes, changes that don't require the worker OS reboot, are applied through eMA. In so much as these changes need to be coordinated with SB specific processes without a full reboot, eMA is involved. Any runtime OS configuration or setting changes are performed by the resident eMA singleton per host. SB software exclusively is the only set of application processes running on worker blades. eMA function assumes this and focuses of coordinating runtime environment changes with the state of SB processes. This includes OS configuration or setting changes required as part of SB process lifecycle transitions as well as SB software upgrades. Given these responsibilities eMA process can run as a user with privileges close to that of 'root'.

In accordance with an embodiment, eMA should be available for manageability of SB on a given blade. It is therefore assumed to be always running eMA is started after the OS boots, then it is monitored and automatically restarted in case of failure.

In accordance with various embodiments, all SB processes have an inherent lifecycle model built into their operation. This model includes three states briefly as follows:

a. Safe Mode—State with minimal components loaded intended for low level diagnosis and recovery purposes. The intention is that a process should always be able to reach this mode and fall back to it in case of critical failures.

b. Admin Mode—A state when all the components have been loaded, but are available for management purposes only. In this case only management interfaces are exposed by the process for provisioning, diagnostic, and configuration purposes.

c. Running Mode—The process is fully online, has joined the relevant cluster services it participates, is ready to receive and process traffic.

A common case is for a SB process to transition between these states in the listed order when starting and in the reverse order when shutting down. Based on administrative intervention, a process could be requested to start or transition to any of these three states. Due to specific categories of errors detected during start-up or while processing traffic a process will automatically take an action to transition to a preceding state. Processes like graceful shutdown are executed as transitions from one state to another. While this behavior exists at the process level it needs to be expanded and coordinated with host HW platform to also occur at the blade level. The different aspects of this lifecycle need to be carried through and mapped to the HW units. HW units are going to be seen as the key manageable artifacts as part of a complete integrated system. eMA is responsible for carrying out this lifecycle coordination function.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for providing unified lifecycles in an integrated system including one or more chassis containing a plurality of blades wherein each blade includes a physical storage memory and one or more central processing units executing a set of software programs, said method comprising:
   providing the set of software programs on each blade with a software lifecycle which includes a safe mode with minimal components of said software programs loaded allowing for low level diagnosis, an admin mode with all components of said software programs loaded but available for management purposes only, and a running mode with all components of said software programs loaded and online for receiving and processing traffic;
   providing an external management agent on each blade, wherein the external management agent operates to create a single unified lifecycle for each blade which integrates and coordinates said software lifecycle with a hardware lifecycle of each blade comprising insertion and removal of each blade;
   wherein the single unified lifecycle coordinated by said external management agent is operative to
      transition said software lifecycle in order through said safe mode and said admin mode into said running mode in coordination with insertion of each blade, and
      transition said software lifecycle in reverse order from said running mode through said admin mode into said safe mode in coordination with removal of each blade; and
   providing an administration console in communication with the external management agent on each blade and configured to access and render state information regarding said single unified lifecycle for each blade and to manage said single unified lifecycle for each blade.

2. The method of claim 1, wherein the single unified lifecycle further includes state information for hardware components of the blade and state information for the software programs executing on said blade.

3. The method of claim 1, wherein the administration console further includes a craft interface that provides a hardware focused view of the chassis, said craft interface rendering information for hardware components contained in said chassis, monitoring state associated with said hardware components and maintaining of faults and alarms associated with said hardware components.

4. The method of claim 1, wherein the administration console is in communication with a plurality of chassis and further includes a management object hierarchy of beans that represent the plurality of chassis and hardware components contained in each of the plurality of chassis being managed, wherein a set of hardware diagnostics and statistics is accessible through the management object hierarchy of beans.

5. The method of claim 1, wherein the administration console further includes an external management controller which sends instructions to each external management agent of said plurality of blades to control operation of said software programs on said plurality of blades.

6. The method of claim 1, wherein:
   in said running mode where with all components of said software programs loaded and online for receiving and processing traffic, said software programs provide a process which is fully online, and has joined a cluster service ready to receive and process traffic.

7. The method of claim 1, wherein:
   said external management agent for each of the plurality of blades controls and monitors shutdown progress and handing over to lower layers in an OS stack for shutdown.

8. A non-transitory computer readable storage medium having instructions stored thereon for providing unified lifecycles in an integrated system including one or more chassis containing a plurality of blades wherein each blade includes a physical storage memory and one or more central processing units executing a set of software programs, which instructions, when executed by a computer system, cause the computer system to perform steps comprising:
   providing a software lifecycle for said set of software programs which includes a safe mode with minimal components of said software programs loaded allowing for low level diagnosis, an admin mode with all components of said software programs loaded but available for management purposes only, and a running mode with all components of said software programs loaded and online for receiving and processing traffic;
   providing an external management agent on each blade, wherein the external management agent operates to create a single unified lifecycle for each blade which integrates and coordinates said software lifecycle with a hardware lifecycle of said blade comprising insertion and removal of said blade;

implementing said single unified lifecycle using said external management agent to transition said software lifecycle in order through said safe mode and said admin mode into said running mode in coordination with insertion of said blade, and transition said software lifecycle in reverse order from said running mode through said admin mode into said safe mode in coordination with removal of said blade; and providing an administration console in communication with the external management agent on each blade and configured to access and render state information regarding said single unified lifecycle for each blade and to manage said single unified lifecycle for each blade.

9. The non-transitory computer readable storage medium of claim 8, wherein the single unified lifecycle further includes state information for hardware components of the blade and state information for the software programs executing on said blade.

10. The non-transitory computer readable storage medium of claim 8, wherein the administration console further includes a craft interface that provides a hardware focused view of the chassis, said craft interface rendering information for hardware components contained in said chassis, monitoring state associated with said hardware components and maintaining of faults and alarms associated with said hardware components.

11. The non-transitory computer readable storage medium of claim 8, wherein the administration console is in communication with a plurality of chassis and further includes a management object hierarchy of beans that represent the plurality of chassis and hardware components contained in each of the plurality of chassis being managed, wherein a set of hardware diagnostics and statistics is accessible through the management object hierarchy of beans.

12. The non-transitory computer readable storage medium of claim 8, wherein the administration console further includes an external management controller which sends instructions to each external management agent of said plurality of blades to control operation of said software programs on said plurality of blades.

13. The non-transitory computer readable storage medium of claim 8, wherein:

in said running mode with all components of said software programs loaded and online for receiving and processing traffic, said software programs provide a process which is fully online, and has joined a cluster service ready to receive and process traffic.

14. The non-transitory computer readable storage medium of claim 8, wherein:

said external management agent for each of the plurality of blades controls and monitors shutdown progress and handing over to lower layers in an OS stack for shutdown.

15. An integrated system comprising:

a chassis containing a plurality of blades wherein each blade includes a physical storage memory and one or more central processing units executing a set of software programs;

a hardware cycle for each blade of said plurality of blades wherein said hardware cycle comprises insertion of said blade into said chassis and removal of said blade from said chassis;

a software lifecycle for said set of software programs for each blade of said plurality of blades, which software cycle includes a safe mode with minimal components of said software programs loaded allowing for low level diagnosis, an admin mode with all components of said software programs loaded but available for management purposes only, and a running mode with all components of said software programs loaded and online for receiving and processing traffic;

an external management agent on each blade of said plurality of blades, wherein the external management agent operates to create a single unified lifecycle for each blade which integrates and coordinates said software lifecycle with said hardware cycle for said blade; and wherein the external management agent is operative to implement said single unified lifecycle to transition said software lifecycle in order through said safe mode and said admin mode into said running mode in coordination with insertion of said blade, and transition said software lifecycle in reverse order from said running mode through said admin mode into said safe mode in coordination with removal of said blade.

16. The integrated system of claim 15, further comprising:

an administration console in communication with the external management agent on each blade and configured to access and render state information regarding said single unified lifecycle for each blade and to manage said single unified lifecycle for each blade.

17. The integrated system of claim 15, further comprising:

an administration console in communication with the external management agent on each blade wherein the administration console comprises a craft interface that provides a hardware focused view of the chassis, said craft interface rendering information for hardware components contained in said chassis, monitoring state associated with said hardware components and maintaining faults and alarms associated with said hardware components.

18. The integrated system of claim 15, further comprising:

an administration console in communication with the external management agent on each blade of said plurality of blades, wherein the administration console includes an external management controller which sends instructions to each external management agent to control operation of said set of software programs on each blade of said plurality of blades.

19. The integrated system of claim 15, wherein:

in said running mode with all components of said software programs loaded and online for receiving and processing traffic, said set of software programs provide a process which is fully online, and has joined a cluster service ready to receive and process traffic.

20. The integrated system of claim 15, wherein:

said external management agent for each of the plurality of blades controls and monitors shutdown progress and handing over to lower layers in an OS stack for shutdown.

* * * * *